US009542714B2

(12) United States Patent
Hernandez et al.

(10) Patent No.: US 9,542,714 B2
(45) Date of Patent: Jan. 10, 2017

(54) CONCEALING DATA WITHIN IMAGES

(71) Applicant: The Boeing Company, Chicago, IL (US)

(72) Inventors: Michael Kevin Hernandez, Charleston, SC (US); John W. Glatfelter, West Chester, PA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/724,202

(22) Filed: May 28, 2015

(65) Prior Publication Data

US 2016/0350891 A1    Dec. 1, 2016

(51) Int. Cl.
*G06K 9/00* (2006.01)
*G06T 1/00* (2006.01)
*G06T 7/40* (2006.01)
*H04N 1/32* (2006.01)

(52) U.S. Cl.
CPC ............. *G06T 1/0064* (2013.01); *G06T 7/408* (2013.01); *H04N 1/32144* (2013.01); *H04N 1/32208* (2013.01); *G06T 2200/28* (2013.01); *G06T 2201/0052* (2013.01); *G06T 2201/0065* (2013.01); *H04N 2201/327* (2013.01); *H04N 2201/3233* (2013.01); *H04N 2201/3253* (2013.01)

(58) Field of Classification Search
None
See application file for complete search history.

(56) References Cited

U.S. PATENT DOCUMENTS

| 5,748,763 | A  | * | 5/1998  | Rhoads ................. H04N 5/90 348/460 |
| 6,330,335 | B1 | * | 12/2001 | Rhoads ................. H04N 5/90 380/252 |
| 6,557,103 | B1 | * | 4/2003  | Boncelet, Jr. ............ H04K 1/00 380/208 |
| 6,675,146 | B2 | * | 1/2004  | Rhoads .............. G06Q 20/1235 380/252 |
| 8,290,202 | B2 | * | 10/2012 | Carr ........................ G06F 21/16 382/100 |
| 8,855,303 | B1 | * | 10/2014 | Glatfelter ................. H04K 1/00 380/277 |
| 9,185,083 | B1 | * | 11/2015 | Glatfelter ............ H04L 63/0428 |

(Continued)

OTHER PUBLICATIONS

"Wavelength to RGB in Python," Noah.org, last modified Sep. 2014, 4 pages, accessed May 14, 2015. http://noah.org/wiki/Wavelength_to_RGB_in_Python.

(Continued)

*Primary Examiner* — Avinash Yentrapati
(74) *Attorney, Agent, or Firm* — Yee & Associates, P.C.

(57) ABSTRACT

A method and apparatus for concealing data. Frequency information is identified for a number of data object types of a set of data objects in the data using a frequency map. A set of pixel values is assigned to the set of data objects based on the frequency information for use in encrypting the set of data objects to form encrypted data. An image is generated that includes a set of pixels that represents the encrypted data. Each pixel in the set of pixels has a pixel value from the set of pixel values that is assigned to a corresponding data object of the set of data objects.

19 Claims, 9 Drawing Sheets

(56) References Cited

U.S. PATENT DOCUMENTS

| | | | | |
|---|---|---|---|---|
| 2002/0191812 | A1* | 12/2002 | Kim | G06T 1/0028 |
| | | | | 382/100 |
| 2004/0141613 | A1* | 7/2004 | Hayashi | H04K 1/00 |
| | | | | 380/28 |
| 2005/0169499 | A1* | 8/2005 | Rodriguez | G01S 19/14 |
| | | | | 382/100 |
| 2012/0163653 | A1* | 6/2012 | Anan | H04N 19/467 |
| | | | | 382/100 |

OTHER PUBLICATIONS

Glatfelter et al., "Concealing Data within Encoded Audio Signals," U.S. Appl. No. 13/900,780, filed May 23, 2015, 33 pages.

\* cited by examiner

CONCEALING DATA WITHIN IMAGES

BACKGROUND INFORMATION

1. Field

The present disclosure relates generally to concealing data and, in particular, to concealing data within images. Still more particularly, the present disclosure relates to a method and apparatus for concealing data as a set of pixels in an image based on a frequency map.

2. Background

Currently, different types of encryption algorithms are present for encrypting data and providing secure communications. However, with some currently available encryption methods, certain risks may still be present. For example, some encryption methods use traditional encryption keys that are shared between both the transmitter and the receiver of encrypted messages. These types of encryption keys may be easily obtained by an unauthorized person, directly or indirectly. An unauthorized person may, for example, use guesswork, brute-force search techniques, dictionary program-based methods, hacking, and/or other types of methods to obtain an encryption key.

Additionally, in some cases, the transmission of data, whether encrypted or not encrypted, may be vulnerable to certain threats through the very awareness of the existence of the transmission. Consequently, concealing the existence of the transmission may be beneficial in certain instances.

Steganography is concerned with concealing the fact that a secret message is being sent, as well as concealing the contents of the secret message. However, some currently available methods for performing steganography may be less effective than desired. Further, these currently available methods for performing steganography may be more complex and expensive than desired. Therefore, as the need for and importance of secure communications increases, it would be desirable to have a method and an apparatus that take into account at least some of the issues discussed above, as well as other possible issues.

SUMMARY

In one illustrative embodiment, a method for concealing data is provided. Frequency information is identified for a number of data object types of a set of data objects in the data using a frequency map. A set of pixel values is assigned to the set of data objects based on the frequency information for use in encrypting the set of data objects to form encrypted data. An image is generated that includes a set of pixels that represent the encrypted data. Each pixel in the set of pixels has a pixel value from the set of pixel values that is assigned to a corresponding data object of the set of data objects.

In another illustrative embodiment, an apparatus comprises an encoder and an image manager. The encoder identifies frequency information for a number of data objects of a set of data objects in data using a frequency map. The encoder assigns a set of pixel values to the set of data objects based on the frequency information for use in encrypting the set of data objects to form encrypted data. The image manager generates an image that includes a set of pixels that represents the encrypted data. Each pixel in the set of pixels has a pixel value from the set of pixel values that is assigned to a corresponding data object of the set of data objects.

In yet another illustrative embodiment, an apparatus comprises an image manger and a decoder. The image manager receives decoding information and an image that includes a set of pixels that represents encrypted data and the decoding information. The decoder decodes the encrypted data using the decoding information to form decrypted data. The decoding information identifies at least one of a frequency map, a selected set of algorithms, or a base image.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method for concealing the transmission of encrypted data in a manner such that unauthorized persons may be unaware of the existence of the transmission. The illustrative embodiments also recognize and take into account that representing encrypted data in the form of pixels in an image may be a cost-effective method for transmitting encrypted data.

Additionally, the illustrative embodiments recognize and take into account that it may be desirable to create added levels of security in the encrypting of the data. For example, providing multiple levels at which data of interest may be converted from one form to another, prior to representing the data as pixels in an image, may provide additional levels of security.

Thus, the illustrative embodiments provide a method and apparatus for concealing data. As one illustrative example, a method for concealing data includes identifying frequency information for a number of data object types of a set of data objects in the data using a frequency map. This frequency information may include, for example, without limitation, a frequency value for each data object type that indicates the frequency of occurrence of that data object type within a selected frame of reference.

Thereafter, a set of pixel values is assigned to the set of data objects based on the frequency information. The set of pixel values may be used for encrypting the set of data objects to form encrypted data. An image is generated that includes a set of pixels that represents the encrypted data. Each pixel in the set of pixels has a pixel value from the set of pixel values that is assigned to a corresponding data object of the set of data objects.

The image may be generated in a manner that conceals both the presence of the encrypted data within the image and the contents of the encrypted data. In one illustrative example, the set of pixels representing the encrypted data may be positioned within the pixels that make up the image such that the presence of the encrypted data within the image is concealed. Thus, the illustrative embodiments provide a method and apparatus for effectively and inexpensively concealing data to enable secure storage and transmission of the data.

Figure 1:
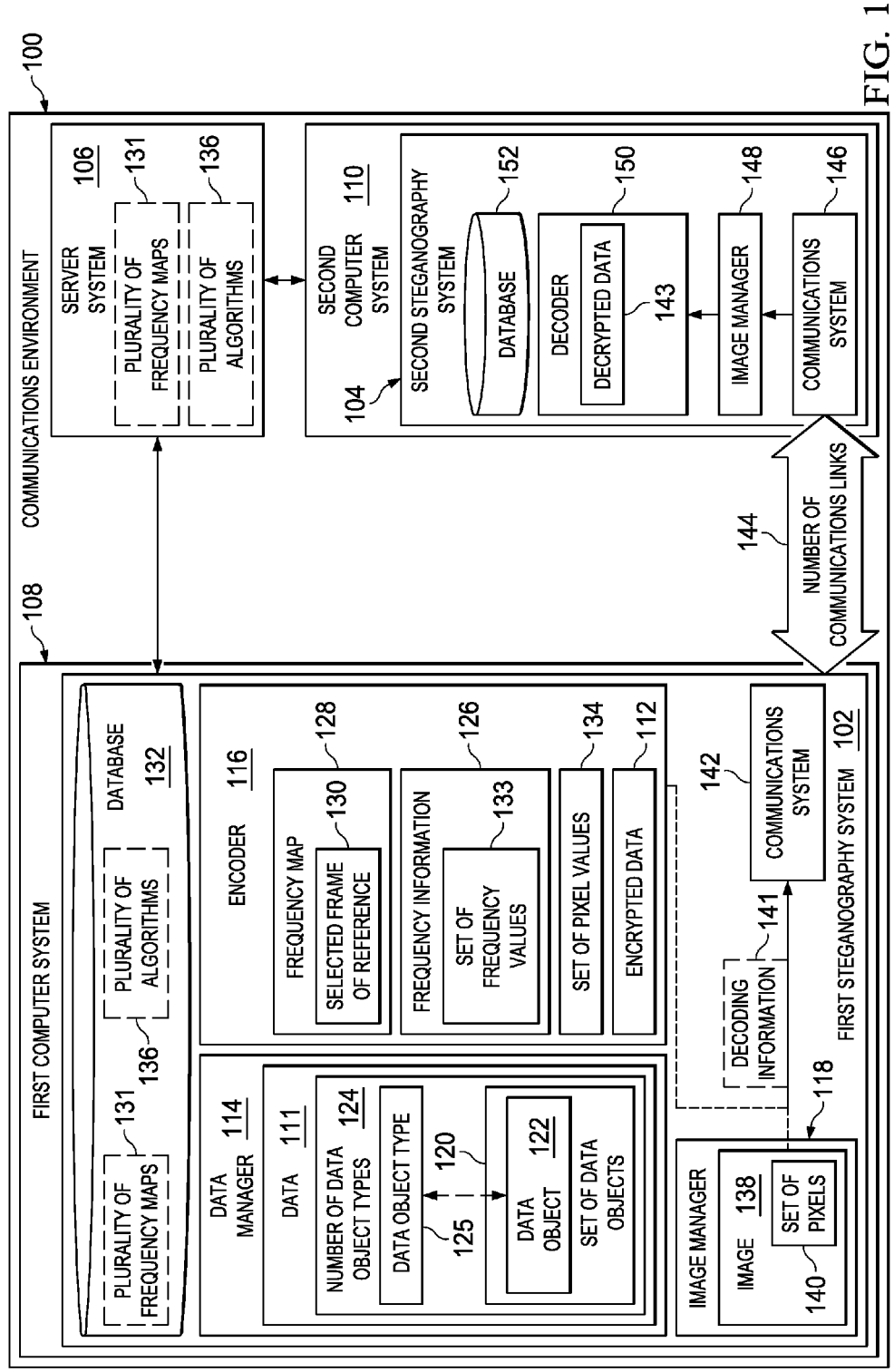
FIG. 1 is block diagram of a communications environment accordance with an illustrative embodiment.

Referring now to the figures and, in particular, with reference to FIG. 1, a block diagram of a communications environment is depicted in accordance with an illustrative embodiment. In this illustrative example, communications environment 100 may include first steganography system 102, second steganography system 104, and server system 106.

First steganography system 102 and second steganography system 104 may be implemented using hardware, firmware, software, or some combination thereof. When software is used, the operations performed by these two systems may be implemented using, for example, without limitation, program code configured to run on a processor unit. When firmware is used, the operations performed by the two systems may be implemented using, for example, without limitation, program code and data and stored in persistent memory to run on a processor unit.

When hardware is employed, the hardware may include one or more circuits that operate to perform the operations performed by the two systems. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative example, first steganography system 102 is implemented using first computer system 108 and the second steganography system 104 is implemented using second computer system 110. Each of first computer system 108 and second computer system 110 may include one or more computers, depending on the implementation.

First steganography system 102 and second steganography system 104 may be in communication with each other. Further, each of first computer system 108 and second computer system 110 may be in communication with server system 106. Server system 106 may be comprised of one or more servers, depending on the implementation. Communications between these different systems may be provided using any number of wireless communications links, wired communications links, optical communications links, other type of communications links, or combination thereof.

In one illustrative example, first steganography system 102 is used to encrypt data 111 to form encrypted data 112. Data 111 may take the form of, for example, without limitation, plain text. Encrypted data 112 may be stored for future use or transmitted, depending on the implementation.

As depicted in this example, first steganography system 102 includes data manager 114, encoder 116, and image manager 118. Each of data manager 114, encoder 116, and image manager 118 may be implemented using hardware, firmware, software, or a combination thereof.

Data manager 114 may receive or generate data 111. In one illustrative example, data manager 114 may receive data 111 in the form of at least one of user input, a message, or a file generated automatically by a program in response to some event. In another illustrative example, data manager 114 may be configured to recognize, generate, or extrapolate data 111 based on the contents of at least one of a file, a document, a scanned image, a message, program code, or some other type of source.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item A and item C; item C; or item B and item C. In some cases, "at least one of item A, item B, or item C" or "at least one of item A, item B, and item C" may mean, but is not limited to, two of item A, one of item B, and ten of item C; four of item B and seven of item C; or some other suitable combination.

Data manager 114 identifies set of data objects 120 in data 111. As used herein, a "set of" items may include one or more items. In this manner, set of data objects 120 may include one or more data objects. A data object in set of data objects 120, such as data object 122, may take the form of a single character, a string of characters, a symbol, a phrase, a word, a sentence, a sentence structure, an expression, a numerical sequence, or some other type of data object.

In particular, data manager 114 identifies number of data object types 124 of set of data objects 120 in data 111. As used herein, a "number of" items may include one or more items. In this manner, number of data object types 124 may include one or more data object types. Data manager 114 may use at least one of a text mining process, a character recognition process, a word recognition process, a phrase recognition process, a sentence structure recognition process, or some other type of process to identify set of data objects 120 of number of data object types 124.

Data object type 125 is an example of one of number of data object types 124. In one illustrative example, data object 122 may be data object type 125. However, in some cases, two or more data objects in set of data objects 120 may be of the same data object type.

For example, without limitation, data 111 may include plain text that includes data object type 125 in the form of a word type, such as "aircraft." The word "aircraft" may appear multiple times within the plain text. Each instance of the word "aircraft" identified by data manager 114 is considered an independent data object of data object type 125.

In some illustrative examples, data object type 125 may be a character type, such as, for example, without limitation, the upper case letter "R," the lower case letter "r," the number "5," the punctuation mark "?," or some other type of character type. In other illustrative examples, data object type 125 may be a sentence structure type, such as, for example, without limitation, a subject positioned before a verb, a verb positioned before a subject, active voice, passive voice, a clause, or some other type of sentence structure.

Encoder 116 may receive set of data objects 120 of number of data object types 124 from data manager 114. Encoder 116 generates frequency information 126 for number of data object types 124 using frequency map 128. Frequency map 128 is associated with selected frame of reference 130.

Selected frame of reference 130 may be a body of textual content. For example, without limitation, selected frame of reference 130 may take the form of a document, a collection of documents, a book, a collection of books, a publication, a journal article, a dictionary, a product of a text mining process, a classified document, intranet text, internal or external social media channels, or some other type of frame of reference.

Frequency map 128 identifies a frequency of occurrence of each data object type of a plurality of data object types with respect to selected frame of reference 130. In other words, frequency map 128 identifies how many times each data object type of the plurality of data object types that make up selected frame of reference 130 occur within selected frame of reference 130.

Frequency map 128 may be one of plurality of frequency maps 131. Depending on the implementation, plurality of frequency maps 131 may be stored in server system 106, in database 132 in first steganography system 102, or in both. Frequency map 128 is selected such that the plurality of data objects found in selected frame of reference 130 will include at least each data object type of number of data object types 124.

Frequency information 126 generated by encoder 116 includes set of frequency values 133 for number of data object types 124 with respect to selected frame of reference 130. As one illustrative example, when data object type 125 is found in data 111, encoder uses frequency map 128 to identify the frequency of occurrence of data object type 125 within selected frame of reference 130. This frequency of occurrence is used to identify or compute the frequency value for data object type 125. In some cases, frequency information 126 may include a ranking of set of frequency values 133 from lowest to highest or highest to lowest.

Encoder 116 then identifies set of pixel values 134 for and assigns set of pixel values 134 to set of data objects 120 based on frequency information 126 for use in encrypting set of data objects 120 to form encrypted data 112. In particular, encoder 116 may use at least one algorithm of plurality of algorithms 136 to identify and assign set of pixel values 134 to set of data objects 120 based on frequency information 126. Depending on the implementation, plurality of algorithms 136 may be stored in server system 106, in database 132, or in both.

In this illustrative example, set of pixel values 134 includes one pixel value for each of set of data objects 120. When multiple data objects are instances of the same data object type, these multiple data objects may each be assigned the same pixel value. Set of pixel values 134 form encrypted data 112.

Image manager 118 receives set of pixel values 134 and uses set of pixel values 134 to generate image 138. Image 138 includes set of pixels 140 that represent encrypted data 112. In particular, each pixel in set of pixels 140 has a pixel value from set of pixel values 134 that is assigned to a corresponding data object of set of data objects 120. The generation of encrypted data 112 and concealment of encrypted data 112 in image 138 in the manner described above may ensure that neither the content of encrypted data 112 nor even the presence of encrypted data 112 within image 138 is obvious or readily apparent to an unauthorized person viewing image 138.

In some illustrative examples, image 138 may be stored in server system 106, in database 132, or in both for future use or transmission. For example, image 138 may be sent to and stored in server system 106 for future retrieval by some other system.

In other illustrative examples, once generated, image 138 is transmitted to second steganography system 104. In some illustrative examples, first steganography system 102 may also send decoding information 141 to second steganography system 104. Decoding information 141 includes information that may be used to decode encrypted data 112 concealed within image 138 to form decrypted data 143. Depending on the implementation, decoding information 141 may be implemented as either part of metadata associated with image 138 or contained within image 138.

In one illustrative example, first steganography system 102 includes communications system 142, which may establish number of communications links 144 with communications system 146 of second steganography system 104. Depending on the implementation of communications system 142 and communications system 146, number of communications links 144 may include at least one of a wireless communications link, a wired communications link, an optical communications link, or some other type of communications link.

Second steganography system 104 may include image manager 148 and decoder 150. Image manager 148 may receive and process image 138 through communications system 146. For example, without limitation, image manager 148 may use decoding information 141 to identify set of pixels 140 in image 138 that represent encrypted data 112. Decoder 150 may then use the pixel value of each of set of pixels 140 and decoding information 141 to decode encrypted data 112 and form decrypted data 143. For example, decoding information 141 may identify information that is stored in at least one of server system 106, in database 152 in second steganography system 104, or in both for use in decoding encrypted data 112. Decrypted data 143 may be substantially identical to the original data 111.

Thus, image 138 may be generated such that decoding of encrypted data 112 concealed within image 138 may be difficult or impossible without decoding information 141.

Further, image 138 is generated such that a hacker or other type of unauthorized person that views image 138 may be unable to recognize the presence of or the contents of encrypted data 112.

Although not shown in FIG. 1, depending on the implementation, first steganography system 102 may also include a decoder implemented in a manner similar to the manner described above for decoder 150 of second steganography system 104. Similarly, although not shown, depending on the implementation, second steganography system 104 may include a data manager and an encoder implemented in a manner similar to the manner described above for data manager 114 and encoder 116 of first steganography system 102.

Figure 2:
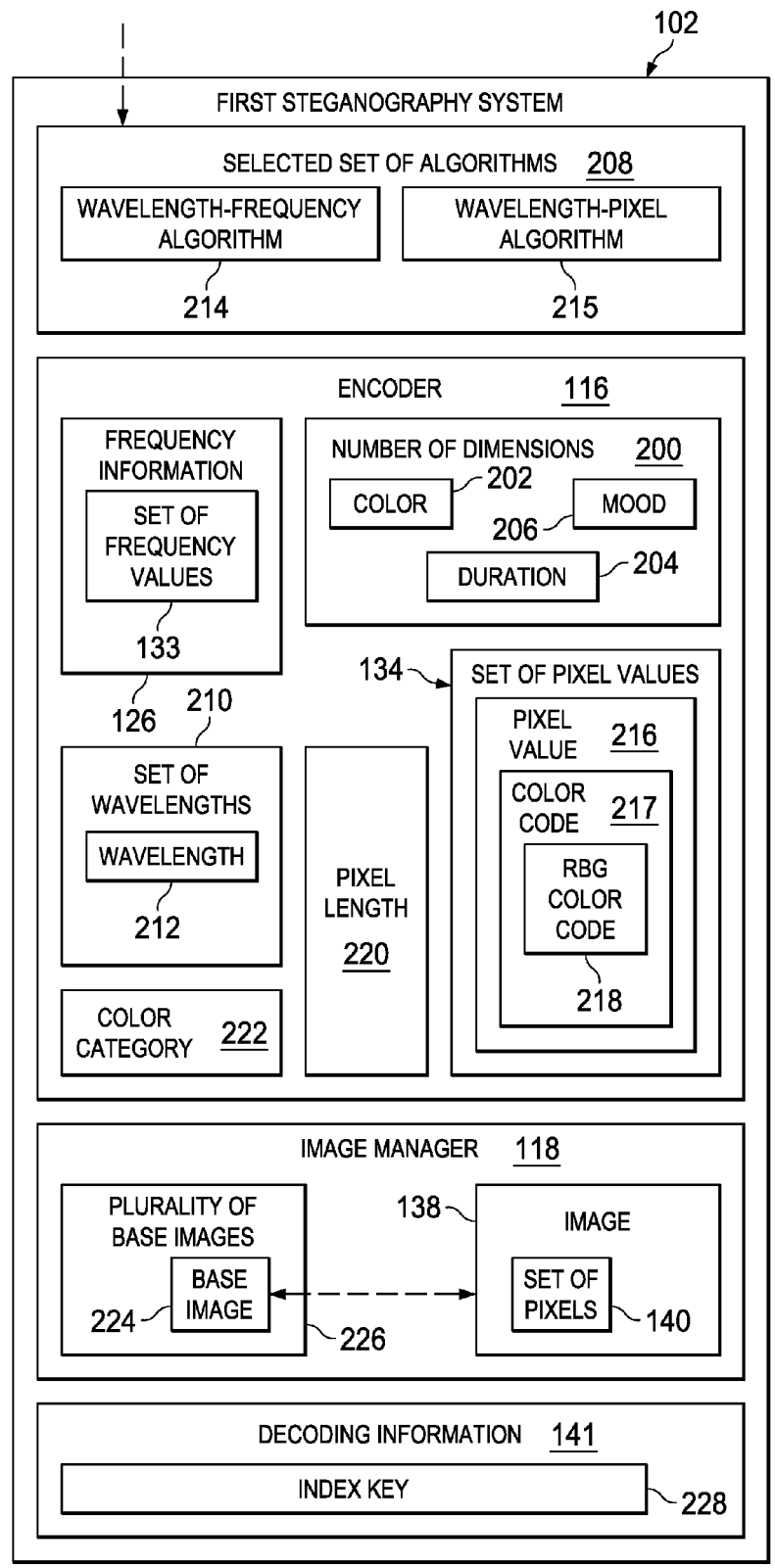
FIG. 2 is a more detailed block diagram of an encoder and an image manager in accordance with an illustrative embodiment.

With reference now to FIG. 2, a more detailed block diagram of encoder 116 and image manager 118 from FIG. 1 is depicted in accordance with an illustrative embodiment. Encoder 116 may identify and assign set of pixel values 134 in a number of different ways.

As depicted, encoder 116 may identify number of dimensions 200 for use in processing frequency information 126. Number of dimensions 200 may include at least one of color 202, duration 204, mood 206, or some other type of dimension or parameter. Encoder 116 may generate set of pixel values 134 with respect to number of dimensions 200 using selected set of algorithms 208. Selected set of algorithms 208 may include, for example, without limitation, one or more of plurality of algorithms 136 from FIG. 1.

In one illustrative example, number of dimensions 200 may include only color 202. In this example, encoder 116 associates set of wavelengths 210 with set of data objects 120 based on frequency information 126.

A wavelength, such as one of set of wavelengths 210, may be a wavelength for a level of radiation along any portion of substantially the entire electromagnetic spectrum in these illustrative examples. In particular, the wavelength may be for visible color of light along the visible light spectrum. For example, the wavelength may be between about 380 nanometers and about 780 nanometers, which corresponds to a visible color range from violet to dark red, respectively.

Encoder 116 associates a wavelength with each of set of data objects 120 based on frequency information 126. As one illustrative example, data object 122 in FIG. 1 may be one of data object type 125. In this example, encoder 116 identifies wavelength 212 for data object 122 based on the corresponding frequency value in set of frequency values 133 identified for data object type 125.

In some cases, wavelength-frequency algorithm 214 is used to identify set of wavelengths 210. Wavelength-frequency algorithm 214 may be configured to compute wavelengths based on the particular frequency map being used. For example, without limitation, when frequency map 128 from FIG. 1 is used, wavelength-frequency algorithm 214 matches the frequency of occurrences identified in frequency map 128 for all of the plurality of data object types found in selected frame of reference 130 to a corresponding wavelength. Encoder 116 then selects the appropriate wavelength for each of set of data objects 120.

Thereafter, encoder 116 identifies set of pixel values 134 based on set of wavelengths 210. In some cases, encoder uses wavelength-pixel algorithm 215 to identify set of pixel values 134. Wavelength-pixel algorithm 215 may take a plurality of possible wavelengths and match each possible wavelength to a pixel value. For example, wavelength-pixel algorithm 215 may match each possible wavelength based on wavelength-frequency algorithm 214 to a corresponding pixel value.

As one illustrative example, pixel value 216 may be identified for wavelength 212. In one illustrative example, pixel value 216 may take the form of color code 217, which may be based on some color model or schema. In one illustrative example, color code 217 may take the form of RGB color code 218. RGB color code 218 may include three sub-values, which include a red value, a green value, and a blue value. In other illustrative examples, color code 217 may take some other form, such as, for example, without limitation, a CMY (cyan-magenta-yellow) color code, a CMYK (cyan-magenta-yellow-black) color code, an HSV (hue-saturation-value) color code, an HSL (hue-saturation-lightness) color code, a hex color code, or some other type of color code.

In other illustrative examples, number of dimensions 200 may include both color 202 and duration 204. Adding the dimension of duration 204 may add yet another level of data conversion, which, in turn, adds yet another level of security. In these examples, encoder 116 identifies duration 204 for a selected data object type in number of data object types 124 from FIG. 1 based on a number of times that the selected data object type is present within the data 111.

For example, without limitation, if the selected data object type is data object type 125, data object type 125 is the word "aircraft," and the word "aircraft" appears three times in data 111, then duration 204 for data object type 125 is three. Encoder 116 identifies pixel length 220 for data object type 125. Pixel length 220 is the number of pixels in image 138 that will be used to represent data object type 125. Depending on the implementation, pixel length 220 may be equal to or some multiple of duration 204. In this manner, every instance of data object type 125 in data 111 will be represented by a number of pixels equaling pixel length 220, each of which may have pixel value 216.

In some illustrative examples, pixel length 220 may be based on some other type of algorithm for duration 204. For example, duration 204 may be selected based on set of data objects 120. An algorithm may specify that every third data object in set of data objects 120 is to be multiplied by two in duration 204 such that pixel length 220 for every third data object is two. That same algorithm may then specify that every seventh data object in set of data objects 120 is to be multiplied by four in duration 204 such that pixel length 220 for every seventh data object is four. Of course, some other type of algorithm may be used to compute the duration, and thereby pixel length 220 for each of set of data objects 120.

In still other illustrative examples, number of dimensions 200 may include color 202 and mood 206. With respect to mood 206, encoder 116 evaluates set of data objects 120 to identify mood 206 for set of data objects 120. For example, encoder 116 may use a text mining algorithm to ascertain mood 206 of set of data objects 120. Different moods may correspond to different color categories. For example, without limitation, an angry mood may correspond to a red color category, while a happy mood may correspond to a yellow color category.

Encoder 116 identifies color category 222 for set of data objects 120 based on mood 206 of set of data objects 120. Encoder 116 then associates set of data objects 120 with set of wavelengths 210 that correspond to color category 222 based on frequency information 126. As one illustrative example, when color category 222 is yellow, the possible wavelengths may range from about 510 nanometers to about 580 nanometers. Encoder 116 may use wavelength-frequency algorithm 214 to match each of set of frequency values 133 to a corresponding one of the possible wavelengths to identify set of wavelengths 210 for set of data objects 120. Encoder 116 may then use wavelength-pixel algorithm 215 to identify set of pixel values 134 for set of data objects 120 based on this set of wavelengths 210. In this manner, set of pixel values 134 may incorporate both the dimensions of color 202 and mood 206.

In still other illustrative examples, number of dimensions 200 may include color 202, duration 204, and mood 206. In this manner, set of pixel values 134 may be generated in a number of different ways with varying levels of security.

Image manager 118 uses set of pixel values 134 that have been generated based on number of dimensions 200 to generate image 138. In one illustrative example, image 138 is created using only set of pixels 140 for set of data objects 120. In other illustrative examples, set of pixels 140 for set of data objects 120 may be inserted into base image 224. Base image 224 may be selected from one of plurality of base images 226. Plurality of base images 226 may be stored in server system 106 in FIG. 1, in database 132 in FIG. 1, or in both.

In one illustrative example, plurality of base images 226 may be a plurality of photographs capturing a variety of different types of scenes, environments, people, artwork, abstract art, and animals, as well as different color schemes. Base image 224 may be selected such that set of pixels 140 may be "visually cloaked" by base image 224 when set of pixels 140 are inserted into base image 224.

As one illustrative example, each of set of pixels 140 may be scattered throughout the plurality of pixels that make up base image 224 to form image 138. Image 138 is generated such that each of set of pixels 140 is not readily distinguishable from the remaining pixels of image 138. This scattering may be performed randomly according to a random sequence generator in one illustrative example. In another example, the scattering may be performed based on a preselected pattern.

In other illustrative examples, set of pixels 140 may be created in the form of a line, a grid, or some other type of shape that is then inserted into one area of base image 224. The selection of base image 224 and the positioning of set of pixels 140 within base image 224 to form image 138 are performed such that a presence of encrypted data 112 represented by set of pixels 140 is concealed. In other words, image 138 is generated such that set of pixels 140 is not readily distinguishable from the remaining portion of image 138.

At least one of data manager 114 from FIG. 1, encoder 116, or image manager 118 may generate decoding information 141. Decoding information 141 may identify at least one of frequency map 128 in FIG. 1, selected set of algorithms 208, or base image 224 that was used to ultimately generate image 138. As one illustrative example, decoding information 141 may include index key 228 that includes an index for frequency map 128, an index for each algorithm in selected set of algorithms 208, and an index for base image 224. Index key 228 may be only accessible at second steganography system 104 in FIG. 1 by an authorized user. The authorized user may use index key 228 to retrieve at least one of frequency map 128, selected set of algorithms 208, or base image 224 from at least one of server system 106 or database 152 in second steganography system 104 in FIG. 1 for use in decoding set of pixels 140 in image 138 to obtain decrypted data 143.

In this manner, first steganography system 102 provides a means of securely communicating encrypted data 112, while concealing the presence of and content of encrypted data 112. The process of encrypting data 111 to form encrypted data 112 and generating image 138 may be cost-effective and effective with respect to data security.

The illustrations of communications environment 100 in FIG. 1 and first steganography system 102 in FIG. 2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, data manager 114 may be configured to analyze set of data objects 120 and identify mood 206 of set of data objects 120, and thereby mood 206 of data 111. In other illustrative examples, data manager 114 may be implemented as part of encoder 116. In still other illustrative examples, image manager 118 may be implemented as part of encoder 116.

In some cases, server system 106 may be implemented as part of first computer system 108, second computer system 110, or both. For example, database 132 may be stored on a server of server system 106 that is implemented as part of first computer system 108. In another illustrative example, database 152 may be stored on a server of server system 106 that is implemented as part of second computer system 110.

In other illustrative examples, set of pixels 140 may be scattered through more than one image. For example, instead of being scattered through base image 224, set of pixels 140 may be scattered through a sequence of base images. In one illustrative example, the sequence of base images may take the form of a sequence of video frames. In this manner, set of pixels 140 may be scattered throughout a video. For example, without limitation, one or more of a set number of pixels may be inserted within each frame of a sequence of video frames.

In some illustrative examples, multiple messages may be cloaked within base image 224 to form image 138. For example, set of pixels 140 and another set of pixels 140 may both be scattered throughout base image 224 to form image 138.

Figure 3:
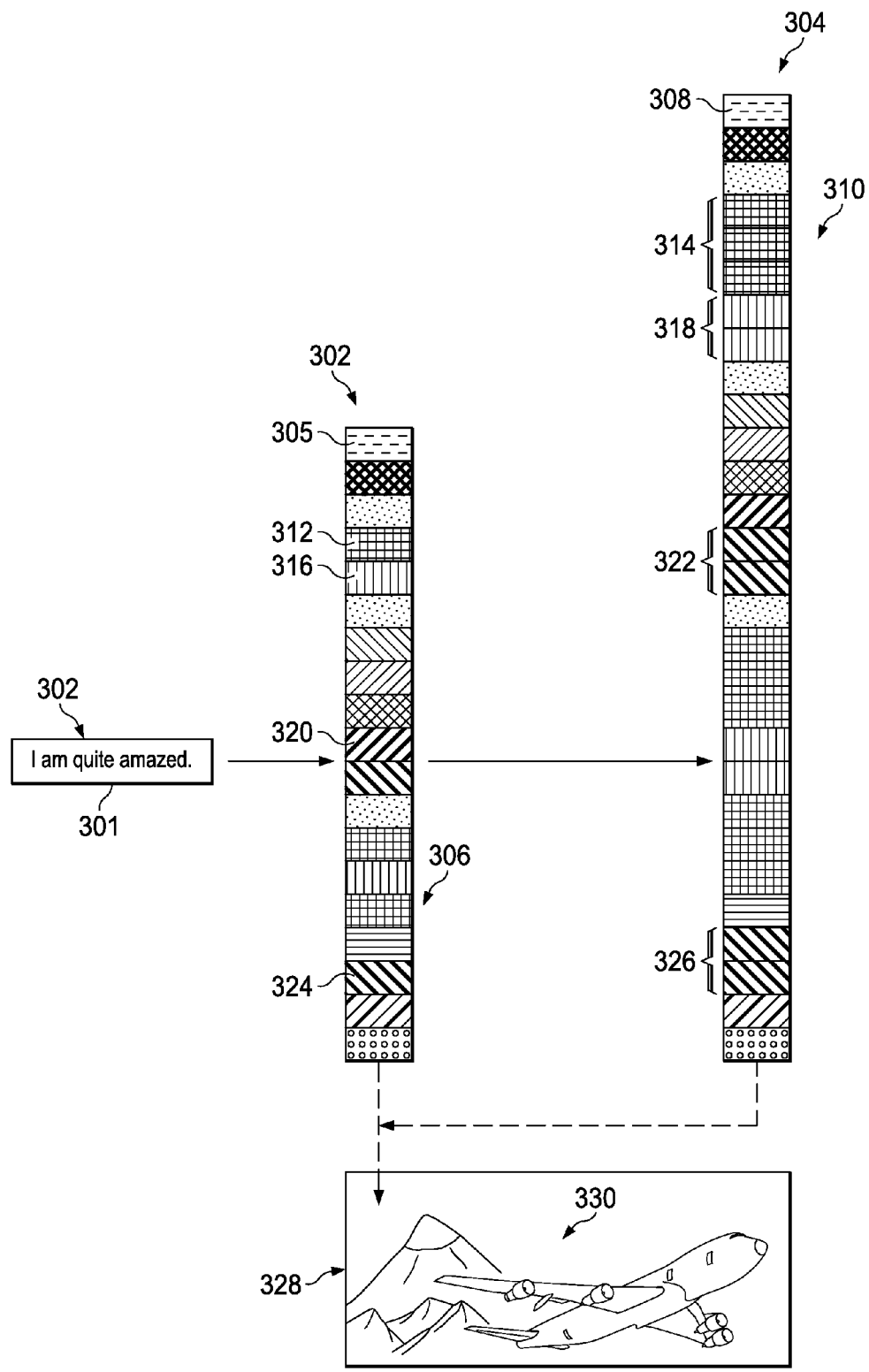
FIG. 3 is a diagrammatic representation of one manner of generating an image that conceals data in a message in accordance with an illustrative embodiment.

With reference now to FIG. 3, a diagrammatic representation of one manner of generating an image that conceals data is depicted in accordance with an illustrative embodiment. In this illustrative example, message 300 contains plain text 301, which may be an example of one implementation for data 111 in FIG. 1.

Plain text 301 may be encrypted and concealed using set of pixels 302. Set of pixels 302 may be an example of one implementation for set of pixels 140 in FIG. 1. In this illustrative example, set of pixels 302 may be generated with respect to a single dimension, which is color. In FIG. 3, different colors are represented by different patterns. Set of pixels 304, which may be an example of another implementation for set of pixels 140 in FIG. 1, may be generated with respect to the dimensions of both color and duration.

As depicted, set of pixels 302 includes start pixel 305 and encrypted pixels 306. Start pixel 305 has a pixel value that indicates the beginning of encrypted pixels 306. Each of encrypted pixels 306 represents the encrypted form of a corresponding character of plain text 301.

Similarly, set of pixels 302 includes start pixel 308 and encrypted pixels 310. Start pixel 308 has a pixel value that indicates the beginning of encrypted pixels 310. Each of encrypted pixels 310 corresponds to the encrypted form of a corresponding character of plain text 301. However, some of the characters of plain text 301 are represented by more than one of encrypted pixels 310 based on duration.

For example, the character "a" occurs three times within message 300; the character "e" occurs two times within message 300; and the character "m" occurs two times within message 300. In set of pixels 302, pixel 312 represents the first "a" of message 300. However, in set of pixels 304, group of pixels 314 represents the first "a" of message 300. Group of pixels 314 has a pixel length of three, which is the same as the duration of "a" within message 300.

In a similar manner, pixel 316 represents the first "m" of message 300. However, in set of pixels 304, group of pixels 318 represents the first "m" of message 300. Group of pixels 316 has a pixel length of two, which is the same as the duration of "m" within message 300.

Further, pixel 320 represents the first "e" of message 300. However, in set of pixels 304, group of pixels 322 represents the first "e" of message 300. Group of pixels 322 has a pixel length of two, which is the same as the duration of "e" within message 300. Still further, pixel 324 represents the last "e" of message 300. However, in set of pixels 304, group of pixels 326 represents the first "e" of message 300. Group of pixels 326 has a pixel length of two, which is the same as the duration of "e" within message 300.

Either set of pixels 302 or set of pixels 304 may be used to create an image. As one illustrative example, set of pixels 302 may form an image that comprises only set of pixels 302 oriented vertically as shown. In another illustrative example, set of pixels 304 may form an image that comprises only set of pixels 304 oriented vertically as shown.

In other illustrative examples, set of pixels 302 or set of pixels 304 may be concealed within a base image, such as base image 328. Base image 328 is comprised of plurality of pixels 330. Plurality of pixels 330 may include thousands of pixels in this illustrative example. Depending on the implementation, either set of pixels 302 or set of pixels 304 may be scattered throughout base image 328 such that the presence of encrypted data represented by that set of pixels is concealed in a manner that is not obvious or visible to the naked human eye. The scattering may be performed according to a randomly generated sequence or some preselected sequence.

Although set of pixels 302 and set of pixels 304 are shown vertically oriented in FIG. 3, a set of pixels may be oriented in some other manner in other illustrative examples. For example, without limitation, a set of pixels may be oriented horizontally, diagonally, or at some other angle. In some cases, the set of pixels may be arranged to form a shape such as, for example, without limitation, a square, a rectangle, a triangle, or some other type of shape.

Figure 4:
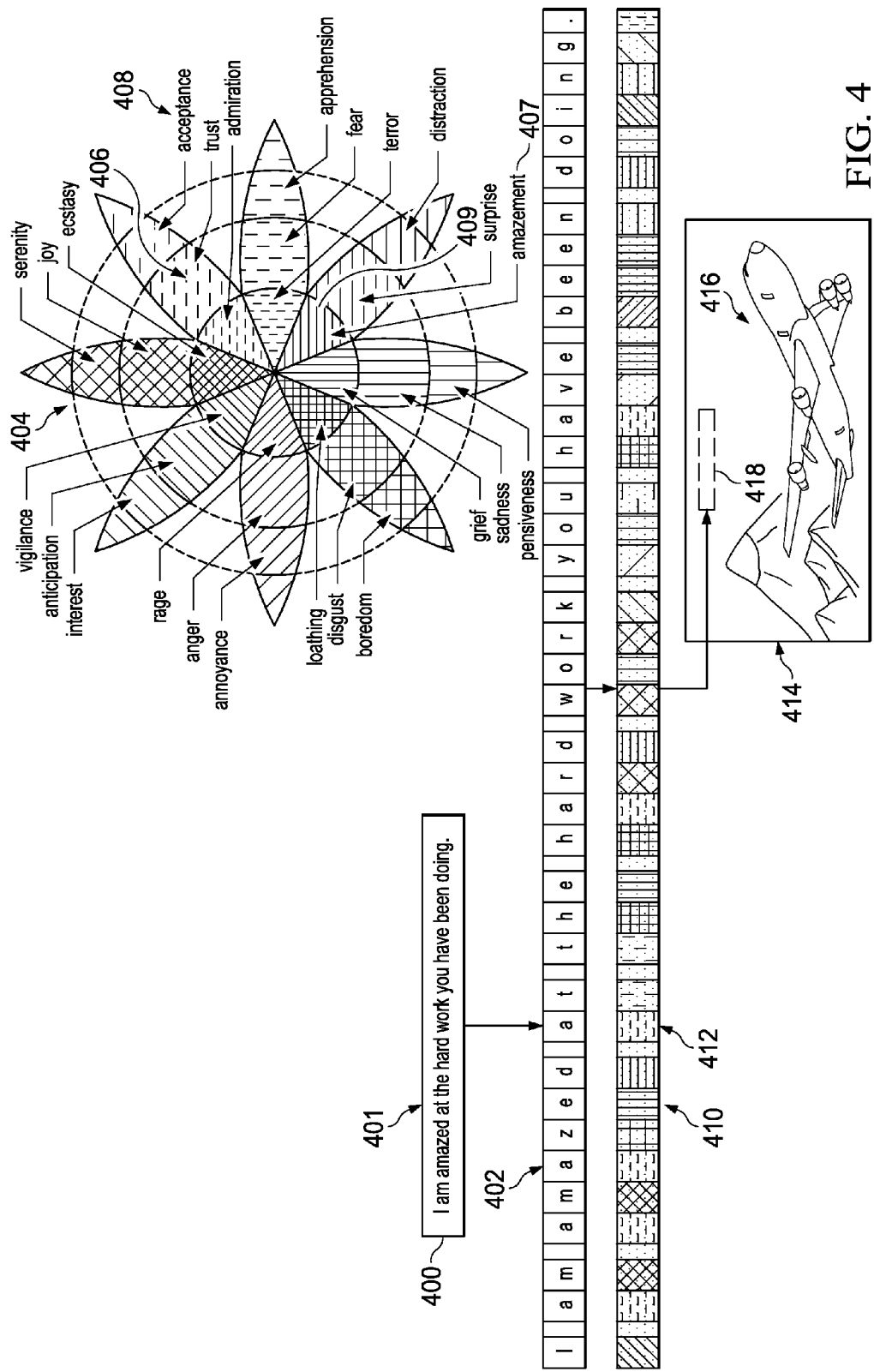
FIG. 4 is a diagrammatic representation of the process of generating a set of pixels to represent encrypted data in accordance with an illustrative embodiment.

With reference now to FIG. 4, a diagrammatic representation of the process of generating a set of pixels to represent encrypted data is depicted in accordance with an illustrative embodiment. In this illustrative example, message 400 contains plain text 401, which may be an example of one implementation for data 111 in FIG. 1.

Set of characters 402 may be identified in plain text 401. Set of characters 402 is an example of one implementation for set of data objects 120 in FIG. 1.

Color-mood map 404 matches color categories 406 to moods 408. Color-mood map 404 is only one example of one manner in which a color map matching color categories to moods 408 may be implemented. In FIG. 4, the different color categories and different colors are represented by patterns. An encoder, such as encoder 116 in FIG. 1, may evaluate the mood of plain text 401 and determine that the mood of plain text 401, and thereby message 400, is one of amazement 407, which corresponds to medium blue color category 409.

Based on medium blue color category 409 and a set of frequency values identified for set of characters 402 based on a frequency map and a selected frame of reference, set of pixels 410 having set of colors 412 may be generated. Set of colors 412 may be based on a set of pixel values that correspond to varying tints, shades, and tones of medium blue color category 409. In other words, each of the set of pixel values may correspond to a wavelength that is associated with medium blue color category 409.

In one illustrative example, set of pixels 410 may be concealed within a base image, such as base image 414. Base image 414 is comprised of plurality of pixels 416. Plurality of pixels 416 may include thousands of pixels in this illustrative example. Set of pixels 410 may be positioned within area 418 of base image 414 such that the presence of encrypted data represented by set of pixels 410 is concealed in a manner that is not obvious or visible to the naked human eye.

Figure 5:
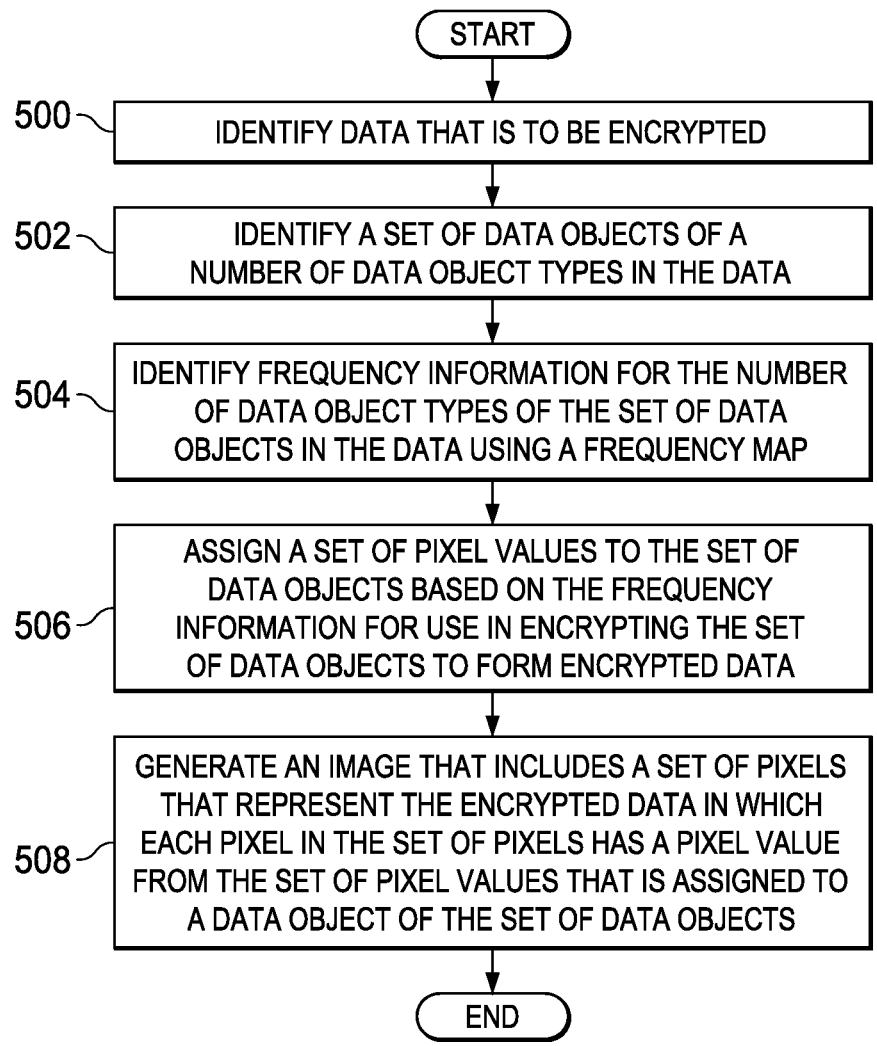
FIG. 5 is a flowchart of a process for concealing data in accordance with an illustrative embodiment.

With reference now to FIG. 5, a flowchart of a process for concealing data is depicted in accordance with an illustrative embodiment. The process illustrated in FIG. 5 may be performed to conceal, for example, without limitation, data 111 in FIG. 1. Further, this process may be performed using, for example, without limitation, first steganography system 102 in FIG. 1.

The process begins by identifying data that is to be encrypted (operation 500). The data may take the form of, for example, without limitation, plain text. Next, a set of data objects of a number of data object types in the data is identified (operation 502).

Then, frequency information is identified for the number of data object types of the set of data objects in the data using a frequency map (operation 504). The frequency map may correspond to a selected frame of reference. Next, a set of pixel values is assigned to the set of data objects based on the frequency information for use in encrypting the set of data objects to form encrypted data (operation 506).

Thereafter, an image that includes a set of pixels that represent the encrypted data is generated in which each pixel in the set of pixels has a pixel value from the set of pixel values that is assigned to a corresponding data object of the set of data objects (operation 508), with the process terminating thereafter. The image generated in operation 508 conceals the presence of encrypted data with the added security of the encryption being based on a frequency map that is particular to a selected frame of reference.

Figure 6:
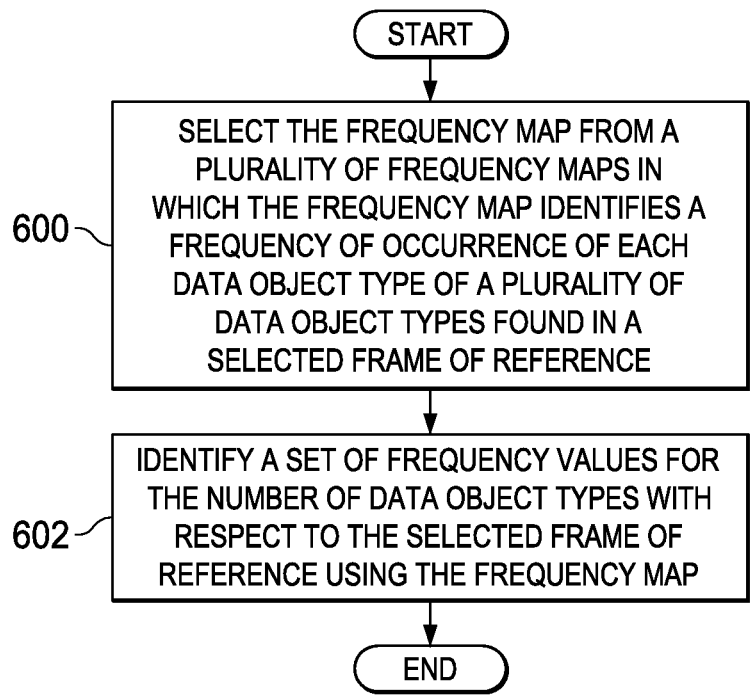
FIG. 6 is a flowchart of a process for identifying frequency information in accordance with an illustrative embodiment.

With reference now to FIG. 6, a flowchart of a process for identifying frequency information is depicted in accordance with an illustrative embodiment. The process illustrated in FIG. 6 may be performed by, for example, without limitation, encoder 116 in FIG. 1 to generate frequency information 126 in FIG. 1. This process may be an example of one manner in which operation 504 in FIG. 5 may be performed.

The process may begin by selecting the frequency map from a plurality of frequency maps in which the frequency map identifies a frequency of occurrence of each data object type of a plurality of data object types found in a selected frame of reference (operation 600). Next, a set of frequency values is identified for the number of data object types with respect to the selected frame of reference using the frequency map (operation 602), with the process terminating thereafter.

In operation 602, a frequency value is identified for each of the number of data object types identified in operation 502 in FIG. 2. The frequency value for a particular data object type may be based on the frequency of occurrence of that data object type within the selected frame of reference, as identified by the frequency map.

Figure 7:
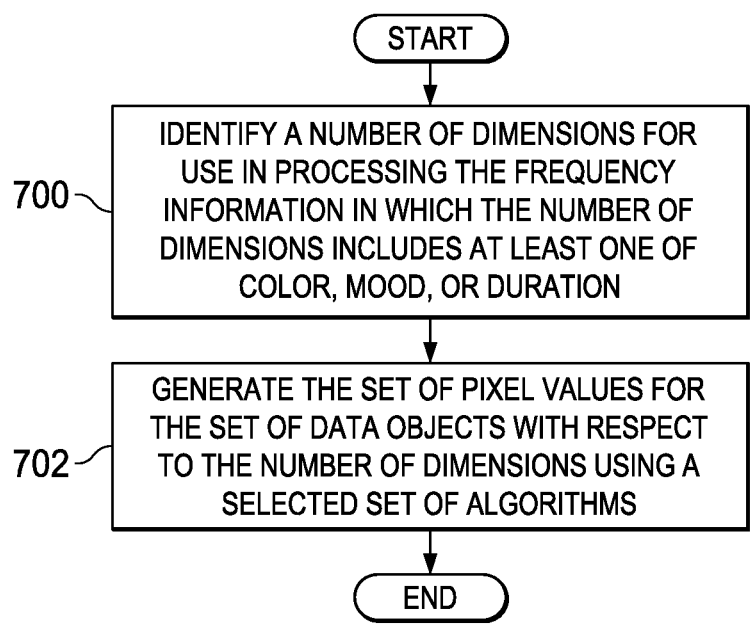
FIG. 7 is a flowchart of a process for assigning a set of pixel values to a set of data objects in accordance with an illustrative embodiment.

With reference now to FIG. 7, a flowchart of a process for assigning a set of pixel values to a set of data objects is depicted in accordance with an illustrative embodiment. The process illustrated in FIG. 7 may be performed by, for example, without limitation, encoder 116 in FIG. 1 to assign set of pixel values 134 to set of data objects 120 in FIG. 1. This process may be an example of one manner in which operation 506 in FIG. 5 may be performed.

The process begins by identifying a number of dimensions for use in processing the frequency information in which the number of dimensions includes at least one of color, mood, or duration (operation 700). Next, the set of pixel values is generated for the set of data objects with respect to the number of dimensions using a selected set of algorithms (operation 702), with the process terminating thereafter.

Figure 8:
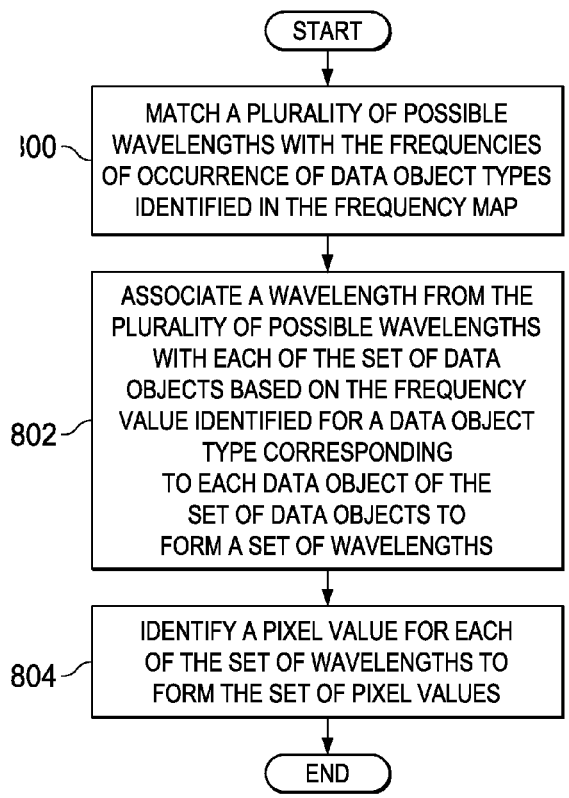
FIG. 8 is a flowchart of a process for assigning a set of pixel values to a set of data objects in accordance with an illustrative embodiment.

With reference now to FIG. 8, a flowchart of a process for assigning a set of pixel values to a set of data objects is depicted in accordance with an illustrative embodiment. The process illustrated in FIG. 8 may be performed by, for example, without limitation, encoder 116 in FIG. 1 to assign set of pixel values 134 to set of data objects 120 in FIG. 1. This process may be an example of one manner in which operation 506 in FIG. 5 may be performed.

The process may begin by matching a plurality of possible wavelengths with the frequencies of occurrence of data object types identified in the frequency map (operation 800). Next, a wavelength from the plurality of possible wavelengths is associated with each of the set of data objects based on the frequency value identified for a data object type corresponding to each data object of the set of data objects to form a set of wavelengths (operation 802).

Thereafter, a pixel value is identified for each of the set of wavelengths to form the set of pixel values (operation 804), with the process terminating thereafter. This set of pixel values may then be used to generate the image as described in operation 508 in FIG. 5.

Figure 9:
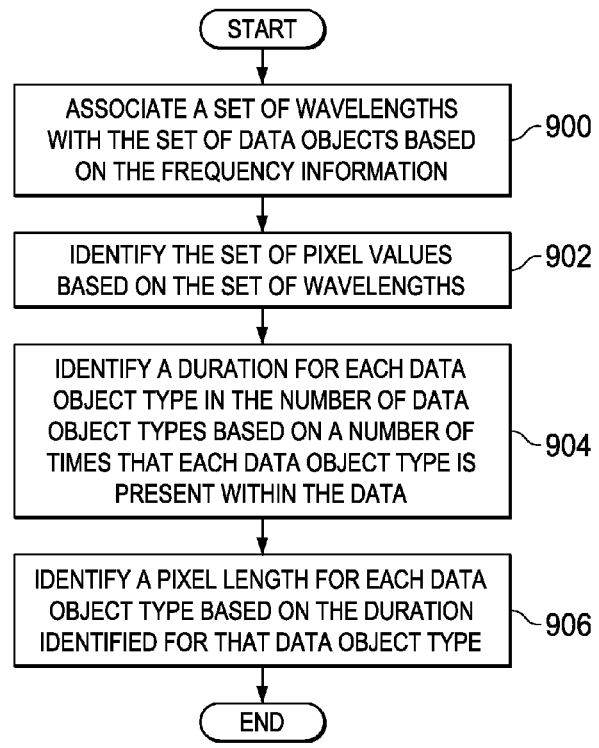
FIG. 9 is a flowchart of a process for assigning a set of pixel values to a set of data objects in accordance with an illustrative embodiment.

With reference now to FIG. 9, a flowchart of a process for assigning a set of pixel values to a set of data objects is depicted in accordance with an illustrative embodiment. The process illustrated in FIG. 9 may be performed by, for example, without limitation, encoder 116 in FIG. 1 to assign set of pixel values 134 to set of data objects 120 in FIG. 1. This process may be an example of one manner in which operation 506 in FIG. 5 may be performed.

The process may begin by associating a set of wavelengths with the set of data objects based on the frequency information (operation 900). Next, the set of pixel values is identified based on the set of wavelengths (operation 902).

Thereafter, a duration is identified for each data object type in the number of data object types based on a number of times that each data object type is present within the data (operation 904). In other illustrative examples, a duration for each data object type may be identified in some other manner using some other type of algorithm. For example, an algorithm may specify that every fifth data object be multiplied by two in duration such that two pixels are used to represent that fifth data object, while every tenth data object is be multiplied by three in duration. A pixel length is then identified for each data object type based on the duration identified for that data object type (operation 906), with the process terminating thereafter.

Figure 10:
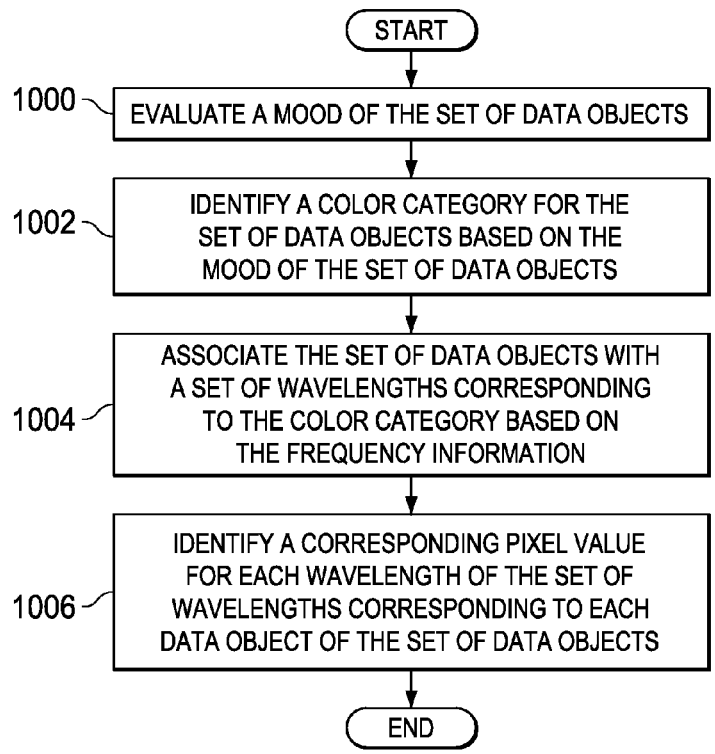
FIG. 10 is a flowchart of a process for assigning a set of pixel values to a set of data objects in accordance with an illustrative embodiment.

With reference now to FIG. 10, a flowchart of a process for assigning a set of pixel values to a set of data objects is depicted in accordance with an illustrative embodiment. The process illustrated in FIG. 10 may be performed by, for example, without limitation, encoder 116 in FIG. 1 to assign set of pixel values 134 to set of data objects 120 in FIG. 1. This process may be an example of one manner in which operation 506 in FIG. 5 may be performed.

The process may begin by evaluating a mood of the set of data objects (operation 1000). Next, a color category is identified for the set of data objects based on the mood of the set of data objects (operation 1002).

Thereafter, the set of data objects is associated with a set of wavelengths corresponding to the color category based on the frequency information (operation 1004). The frequency information in operation 1004 may be, for example, the frequency information generated in operation 504 in FIG. 5. Then, a corresponding pixel value for each wavelength of the set of wavelengths corresponding to each data object of the set of data objects is identified (operation 1006), with the process terminating thereafter.

Figure 11:
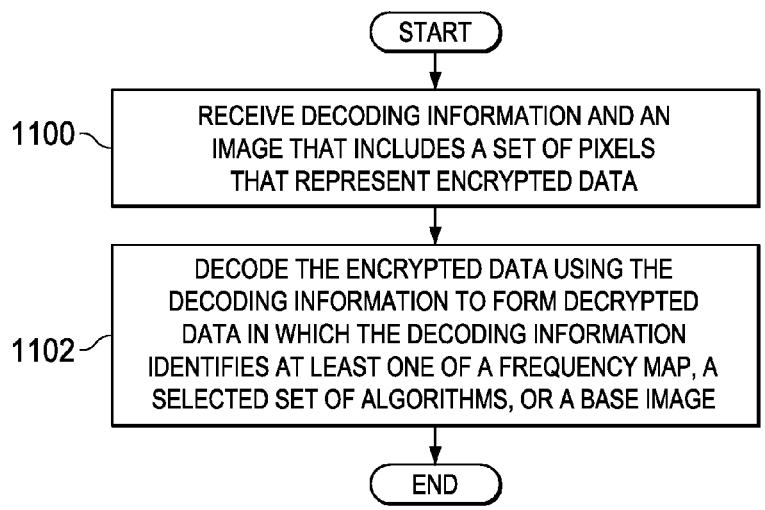
FIG. 11 is a flowchart of a process for decoding data in accordance with an illustrative embodiment.

With reference now to FIG. 11, a flowchart of a process for decoding data is depicted in accordance with an illustrative embodiment. The process illustrated in FIG. 11 may be performed to decode encrypted data such as, for example, without limitation, encrypted data 112 that is concealed in image 138 in FIG. 1. Further, this process may be performed using, for example, without limitation, second steganography system 104 in FIG. 1.

The process may begin by receiving decoding information and an image that includes a set of pixels that represent encrypted data (operation 1100). Next, the encrypted data is decoded using the decoding information to form decrypted data in which the decoding information identifies at least one of a frequency map, a selected set of algorithms, or a base image for use in performing the decoding (operation 1102), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 12:
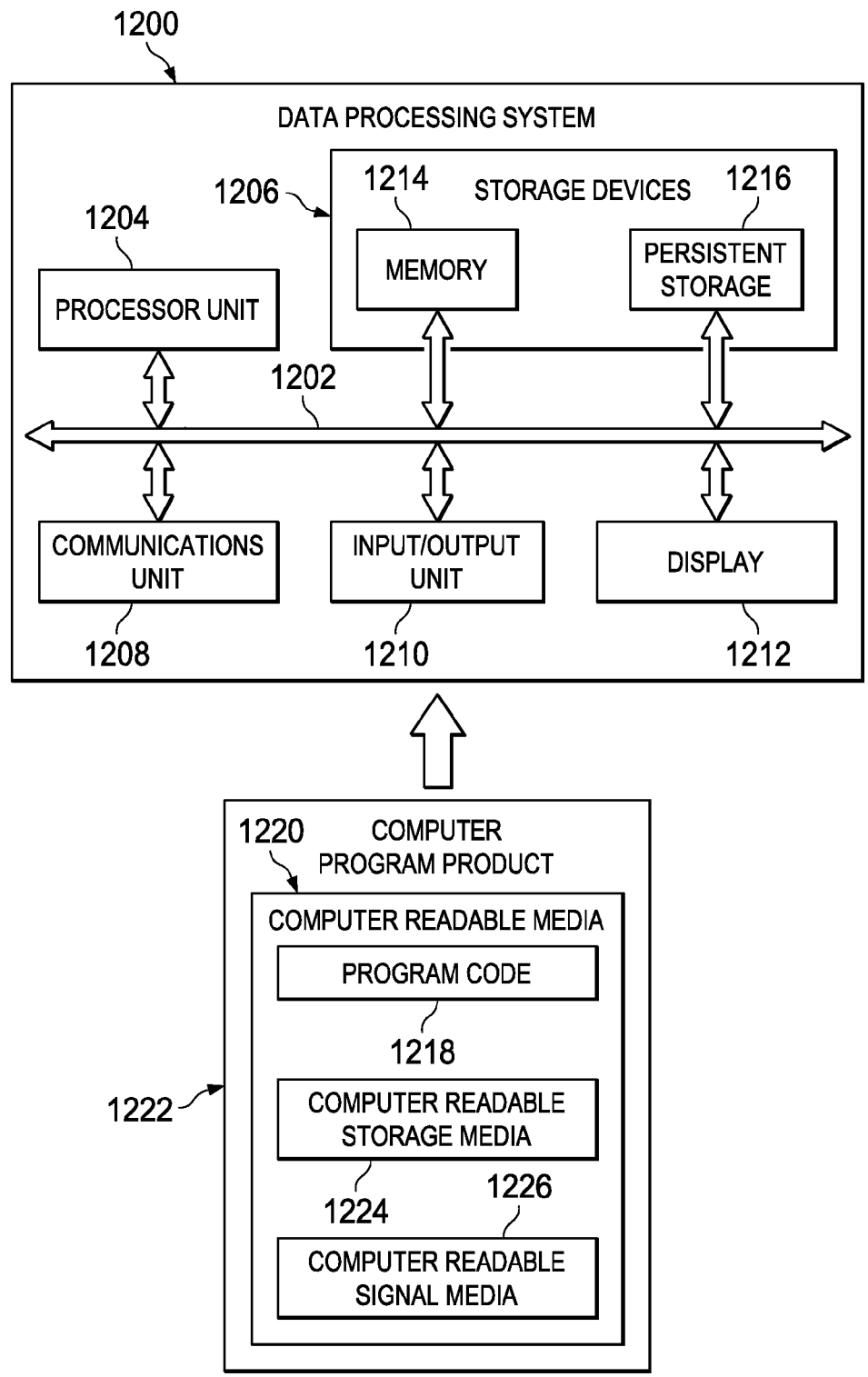
FIG. 12 is a block diagram of a data processing system in accordance with an illustrative embodiment.

Turning now to FIG. 12, a block diagram of a data processing system is depicted in accordance with an illustrative embodiment. Data processing system 1200 may be used to implement first computer system 108, second computer system 110, or both from FIG. 1. As depicted, data processing system 1200 includes communications framework 1202, which provides communications between processor unit 1204, storage devices 1206, communications unit 1208, input/output unit 1210, and display 1212. In some cases, communications framework 1202 may be implemented as a bus system.

Processor unit 1204 is configured to execute instructions for software to perform a number of operations. Processor unit 1204 may comprise a number of processors, a multiprocessor core, and/or some other type of processor, depending on the implementation. In some cases, processor unit 1204 may take the form of a hardware unit, such as a circuit system, an application specific integrated circuit (ASIC), a programmable logic device, or some other suitable type of hardware unit.

Instructions for the operating system, applications, and/or programs run by processor unit 1204 may be located in storage devices 1206. Storage devices 1206 may be in communication with processor unit 1204 through communications framework 1202. As used herein, a storage device, also referred to as a computer readable storage device, is any piece of hardware capable of storing information on a temporary and/or permanent basis. This information may include, but is not limited to, data, program code, and/or other information.

Memory 1214 and persistent storage 1216 are examples of storage devices 1206. Memory 1214 may take the form of, for example, a random access memory or some type of volatile or non-volatile storage device. Persistent storage 1216 may comprise any number of components or devices. For example, persistent storage 1216 may comprise a hard drive, a flash memory, a rewritable optical disk, a rewritable magnetic tape, or some combination of the above. The media used by persistent storage 1216 may or may not be removable.

Communications unit 1208 allows data processing system 1200 to communicate with other data processing systems and/or devices. Communications unit 1208 may provide communications using physical and/or wireless communications links.

Input/output unit 1210 allows input to be received from and output to be sent to other devices connected to data processing system 1200. For example, input/output unit 1210 may allow user input to be received through a keyboard, a mouse, and/or some other type of input device. As another example, input/output unit 1210 may allow output to be sent to a printer connected to data processing system 1200.

Display 1212 is configured to display information to a user. Display 1212 may comprise, for example, without limitation, a monitor, a touch screen, a laser display, a holographic display, a virtual display device, and/or some other type of display device.

In this illustrative example, the processes of the different illustrative embodiments may be performed by processor unit 1204 using computer-implemented instructions. These instructions may be referred to as program code, computer usable program code, or computer readable program code and may be read and executed by one or more processors in processor unit 1204.

In these examples, program code 1218 is located in a functional form on computer readable media 1220, which is selectively removable, and may be loaded onto or transferred to data processing system 1200 for execution by processor unit 1204. Program code 1218 and computer readable media 1220 together form computer program product 1222. In this illustrative example, computer readable media 1220 may be computer readable storage media 1224 or computer readable signal media 1226.

Computer readable storage media 1224 is a physical or tangible storage device used to store program code 1218 rather than a medium that propagates or transmits program code 1218. Computer readable storage media 1224 may be, for example, without limitation, an optical or magnetic disk or a persistent storage device that is connected to data processing system 1200.

Alternatively, program code 1218 may be transferred to data processing system 1200 using computer readable signal media 1226. Computer readable signal media 1226 may be, for example, a propagated data signal containing program code 1218. This data signal may be an electromagnetic signal, an optical signal, and/or some other type of signal that can be transmitted over physical and/or wireless communications links.

The illustration of data processing system 1200 in FIG. 12 is not meant to provide architectural limitations to the manner in which the illustrative embodiments may be implemented. The different illustrative embodiments may be implemented in a data processing system that includes components in addition to or in place of those illustrated for data processing system 1200. Further, components shown in FIG. 12 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for concealing data, the method comprising:
identifying frequency information for a number of data object types of a set of data objects in the data using a frequency map;
assigning a set of pixel values to the set of data objects based on the frequency information for use in encrypting the set of data objects to form encrypted data, wherein assigning the set of pixel values to the set of data objects comprises performing the steps of;
identifying a duration for a selected data object type in the number of data object types; and
identifying a pixel length for the selected data object type based on the duration; and
generating an image that includes a set of pixels that represent the encrypted data, wherein each pixel in the set of pixels has a pixel value from the set of pixel values that is assigned to a corresponding data object of the set of data objects.

2. The method of claim 1, wherein generating the image comprises:
positioning the set of pixels within a plurality of pixels that make up the image such that a presence of the encrypted data within the image is concealed.

3. The method of claim 1, wherein identifying the frequency information comprises:
identifying a set of frequency values for the number of data object types with respect to a selected frame of reference using the frequency map.

4. The method of claim 3, wherein identifying the frequency information further comprises:
selecting the frequency map from a plurality of frequency maps stored in at least one of a server system or a database, wherein the frequency map identifies a frequency of occurrence of each data object type of a plurality of data object types found in the selected frame of reference.

5. The method of claim 1 further comprising:
identifying the set of data objects of the number of data object types in the data, wherein a data object in the set of data objects is selected from one of a single character, a string of characters, a symbol, a phrase, a word, a sentence, a sentence structure, an expression, or a numerical sequence.

6. The method of claim 1, wherein assigning the set of pixel values comprises:
identifying a number of dimensions for use in processing the frequency information, wherein the number of dimensions comprises one or more of: color, mood, or the duration; and
generating the set of pixel values for the set of data objects with respect to the number of dimensions using a selected set of algorithms.

7. The method of claim 1, wherein assigning the set of pixel values comprises:
associating a set of wavelengths with the set of data objects based on the frequency information; and
identifying the set of pixel values based on the set of wavelengths.

8. The method of claim 1, wherein assigning the set of pixel values comprises:
identifying a color category for the set of data objects based on a mood of the set of data objects;
associating the set of data objects with a set of wavelengths corresponding to the color category based on the frequency information; and
identifying a corresponding pixel value for each wavelength of the set of wavelengths corresponding to each data object of the set of data objects.

9. The method of claim 1 further comprising:
transmitting the image from a first computer system to a second computer system over a number of communications links.

10. The method of claim 9 further comprising:
receiving the image at the second computer system; and
decoding the image using decoding information to form decrypted data.

11. An apparatus comprising:
an encoder that identifies frequency information for a number of data object types of a set of data objects in data using a frequency map and assigns a set of pixel values to the set of data objects based on the frequency information for use in encrypting the set of data objects to form encrypted data, wherein the encoder identifies a duration for a selected data object type in the number of object data types and identifies a pixel length for the selected data object type based on the duration; and
an image manager that generates an image that includes a set of pixels that represents the encrypted data, wherein each pixel in the set of pixels has a pixel value from the set of pixel values that is assigned to a corresponding data object of the set of data objects.

12. The apparatus of claim 11, wherein the frequency map identifies a frequency of occurrence of each data object type of a plurality of data object types with respect to a selected frame of reference.

13. The apparatus of claim 11, wherein a data object in the set of data objects is selected from one of a single character, a string of characters, a symbol, a phrase, a word, a sentence, a sentence structure, an expression, or a numerical sequence.

14. The apparatus of claim 11, wherein the encoder identifies a number of dimensions for use in processing the frequency information and wherein the number of dimensions includes comprises one or more of: color, mood, or the duration.

15. The apparatus of claim 11, wherein the image manager and the encoder are implemented on a first computer system and wherein the first computer system further comprises:
a communications system configured to transmit the image to a second computer system over a number of communications links.

16. The apparatus of claim 11 further comprising:
a database storing at least one of a plurality of frequency maps from which the frequency map is selected, a plurality of algorithms, or a plurality of base images.

17. An apparatus comprising:
an image manager that receives decoding information and an image that includes a set of pixels that represent encrypted data and the decoding information, wherein the encrypted data are encrypted by assigning a set of pixel values having a color category for a set of data objects based on a mood of the set of data objects, a set of wavelengths corresponding to the color category based on frequency information, and a corresponding pixel value for each wavelength of the set of wavelengths corresponding to each data object of the set of data objects; and
a decoder that decodes the encrypted data using the decoding information to form decrypted data, wherein the decoding information identifies at least one of a frequency map, a selected set of algorithms, or a base image.

18. The apparatus of claim 17 further comprising:
a database storing at least one of a plurality of frequency maps that includes the frequency map, a plurality of algorithms that includes the selected set of algorithms, or a plurality of base images that includes the base image.

19. The apparatus of claim 17, wherein the decoding information is either part of metadata associated with the image or contained within the image.

* * * * *

UNITED STATES PATENT AND TRADEMARK OFFICE
CERTIFICATE OF CORRECTION

PATENT NO. : 9,542,714 B2
APPLICATION NO. : 14/724202
DATED : January 10, 2017
INVENTOR(S) : Hernandez et al.

It is certified that error appears in the above-identified patent and that said Letters Patent is hereby corrected as shown below:

In the Claims

Column 17, Line 49, change "of object data types" to -- of data object types --
Column 18, Line 13-14, change "dimensions includes comprises" to -- dimensions comprises --

Signed and Sealed this
Thirteenth Day of February, 2018

Andrei Iancu
*Director of the United States Patent and Trademark Office*